United States Patent
Maleki et al.

(10) Patent No.: US 11,929,796 B2
(45) Date of Patent: Mar. 12, 2024

(54) WIRELESS DEVICE-AUTONOMOUS PDSCH RX ANTENNA ADAPTATION

(71) Applicant: Telefonaktiebolaget LM Ericsson (publ), Stockholm (SE)

(72) Inventors: Sina Maleki, Malmö (SE); Andres Reial, Lomma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/634,572

(22) PCT Filed: Aug. 11, 2020

(86) PCT No.: PCT/EP2020/072513
§ 371 (c)(1),
(2) Date: Feb. 11, 2022

(87) PCT Pub. No.: WO2021/028437
PCT Pub. Date: Feb. 18, 2021

(65) Prior Publication Data
US 2022/0321178 A1 Oct. 6, 2022

Related U.S. Application Data

(60) Provisional application No. 62/887,234, filed on Aug. 15, 2019.

(51) Int. Cl.
*H04B 7/0413* (2017.01)
*H04B 7/06* (2006.01)
(Continued)

(52) U.S. Cl.
CPC ......... *H04B 7/0413* (2013.01); *H04B 7/0626* (2013.01); *H04B 7/0877* (2013.01); *H04L 1/0036* (2013.01); *H04L 1/06* (2013.01)

(58) Field of Classification Search
CPC .. H04B 7/0413; H04B 7/0626; H04B 7/0877; H04L 1/0036; H04L 1/06
See application file for complete search history.

(56) References Cited

U.S. PATENT DOCUMENTS

2013/0294494 A1* 11/2013 Wang ..................... H04J 11/004
375/233
2014/0140424 A1* 5/2014 Clevorn ............... H04B 7/0874
375/267
(Continued)

FOREIGN PATENT DOCUMENTS

WO 2018084971 A1 5/2018
WO 2019092684 A1 5/2019

OTHER PUBLICATIONS

CATT, "Power saving scheme with UE adaptation to maximum MIMO layer", 3GPP TSG-RAN WG2 Meeting 106, R2-1905668, (revision of R2-1903127), Reno, USA, May 13-17, 2019, 1-3.
(Continued)

*Primary Examiner* — Janice N Tieu
(74) *Attorney, Agent, or Firm* — Sage Patent Group

(57) ABSTRACT

Methods and apparatuses are disclosed for wireless device (WD)-autonomous physical downlink shared channel (PDSCH) receiver (RX) antenna adaptation. In one embodiment, a method implemented in a WD includes one or more of: estimating an expected number of multiple-input multiple-output (MIMO) layers based at least in part on channel state information (CSI) and/or a sounding reference signal (SRS) configuration; determining a set of antennas of a plurality of antennas to use based at least in part on the estimated expected number of MIMO layers; and/or receiving a MIMO signal using the determined set of antennas. In one embodiment, a method implemented in a network node include receiving a channel state information (CSI) report from the WD; and/or scheduling and/or transmitting a down-
(Continued)

link (DL) channel to the WD using a number of multiple-input multiple-output (MIMO) layers, the number of MIMO layers used based at least in part on the received CSI report.

22 Claims, 6 Drawing Sheets

(51) Int. Cl.
*H04B 7/08* (2006.01)
*H04L 1/00* (2006.01)
*H04L 1/06* (2006.01)

(56) References Cited

U.S. PATENT DOCUMENTS

| | | |
|---|---|---|
| 2015/0139112 A1 | 5/2015 | Park et al. |
| 2016/0301455 A1 | 10/2016 | Nammi et al. |
| 2018/0227094 A1 | 8/2018 | Liu et al. |
| 2019/0158319 A1 | 5/2019 | Cezanne et al. |
| 2019/0174466 A1 | 6/2019 | Zhang et al. |
| 2020/0280427 A1* | 9/2020 | Liu ................ H04L 1/1671 |
| 2022/0123799 A1* | 4/2022 | Varatharaajan ....... H04L 5/0053 |
| 2022/0151017 A1* | 5/2022 | Zhang ................ H04W 76/28 |

OTHER PUBLICATIONS

Qualcomm Incorporated, "Adaptation of maximum number of MIMO Layers", 3GPP TSG-RAN WG1 #98bis, R1-1911131, Chongqing, China, Oct. 14-20, 2019, 1-4.

Samsung, "UE adaptation to maximum number of MIMO layers", 3GPP TSG RAN WG1 #98, R1-1908507, Prague, CZ, Aug. 26-30, 2019, 1-7.

Vivo, "Discussion on MIMI layer adaptation", 3GPP TSG RAN WG1 #97, R1-1906176, Reno, USA, May 13-17, 2019, 1-4.

First Office Action dated Oct. 30, 2023 for Chinese Patent Application No. 202080057166.0, 14 pages. (English translation provided).

* cited by examiner

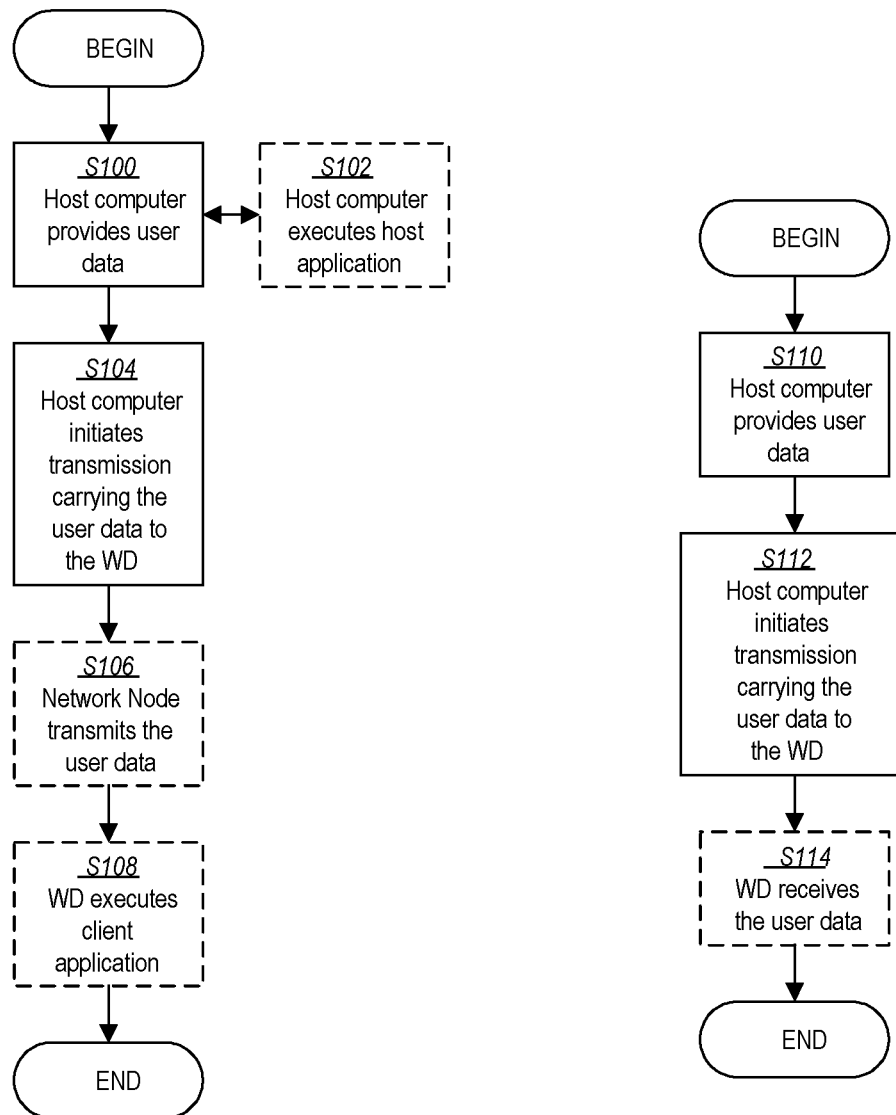

WIRELESS DEVICE-AUTONOMOUS PDSCH RX ANTENNA ADAPTATION

FIELD

The present disclosure relates to wireless communications, and in particular, to wireless device (WD)-autonomous physical downlink shared channel (PDSCH) receiver (RX) antenna adaptation.

INTRODUCTION

Physical downlink shared channel (PDSCH) is a physical channel used for transmitting the downlink shared channel data to a wireless device (WD), such as a user equipment (UE). The transmission over PDSCH can be based on multi-layer transmission, employing spatial processing among several antennas (antenna ports). In $3^{rd}$ Generation Partnership Project (3GPP) New Radio (NR) (also known as "5G"), a downlink (DL) transmission, i.e., transmission from a network node to a WD, can be up to 4 layers for a single codeword (CW), or up to 8 layers for a two codewords (CW) transmission.

The WD is configured via higher layers to expect a maximum number of layers per cell for DL transmission in 3GPP Release 15 (Rel 15), and it has been considered to extend this to per bandwidth part (BWP) in 3GPP Release 16 (Rel 16). Furthermore, the WD can become aware of the exact number of layers the current data is transmitted after decoding a scheduling downlink control information (DCI) of format 1-1.

SUMMARY

Some embodiments advantageously provide methods, systems, and apparatuses for wireless device (WD)-autonomous physical downlink shared channel (PDSCH) receiver (RX) antenna adaptation.

Aspects are provided in the independent claims, and embodiments thereof are provided in the dependent claims.

In one example, a method implemented in a network node includes receiving a channel state information (CSI) report from the WD; and/or scheduling and/or transmitting a downlink (DL) channel to the WD using a number of multiple-input multiple-output (MIMO) layers, the number of MIMO layers used based at least in part on the received CSI report.

According to a first aspect, there is provided a method implemented in a WD includes one or more of: estimating an expected number of multiple-input multiple-output (MIMO) layers based at least in part on channel state information (CSI) and/or a sounding reference signal (SRS) configuration; determining a set of antennas to use; and/or receiving a MIMO signal using the determined set of antennas.

The determination may include a selected set of antennas which comprises at least the same or a larger number than the maximum expected number of MIMO layers. A criterion to select the set may be any of to achieve the minimum power consumption, maximize throughput for the WD, minimize number of hybrid automatic repeat request, HARQ, non-acknowledgements, NACKs, maximize number of HARQ acknowledgements, ACKs, minimize PDSCH block error rate, BLER, maximize signal-to-interference ratio, SINR, and any combination thereof. The criterion may be the combination, wherein the criterion may comprise a weighted trade-off between them. The WD may be arranged to turn off antennas that are not in the selected set, and report a zero or low value for the antennas turned off during CSI measurements and reporting, or sounding reference signal, SRS, transmission.

The WD may be arranged to turn off antennas which are more than the maximum number of layers to save power consumption. The WD may be arranged to turn off the antennas which are more than the maximum number of layers when a first quality metric is satisfied, and to employ at least the same or a larger number than the maximum expected number of MIMO layers until a second quality metric is satisfied. The first and second quality metrics may be the same quality metric. Alternatively, the first and second quality metric may be different, and the second quality metric may take priority over the first quality metric.

The WD and/or the radio interface and/or the processing circuitry may be further configured to turn ON or OFF antennas according to the determined set of antennas.

The estimation may be based on observation of a historical behavior of the network node.

The estimation may include any of that the number of MIMO layers is not a greater number of MIMO layers than an indicated rank indicator, RI, by the WD after a CSI report, that the number of MIMO layers is not a greater number of MIMO layers than the number of configured SRS resources, that the number of MIMO layers is not a greater number of MIMO layers than a specific number of MIMO layers in a specific cell or bandwidth part, BWP, and that the configured type of CSI report is an indication of the expected number of layers.

The estimation may include to determine the exact number of scheduled MIMO layers by decoding a scheduling downlink control information, DCI. The scheduling DCI may be the one scheduling a PDSCH that is transmitted via the MIMO layers. The determination of the exact number of scheduled MIMO layers may include to identify the format of the DCI.

According to a second aspect, there is provided a method implemented in a wireless device, WD. The method comprises estimating an expected number of multiple-input multiple-output, MIMO, layers based at least in part on channel state information, CSI, and/or a sounding reference signal, SRS, configuration, determining a set of antennas of a plurality of antennas to use; and/or receiving a MIMO signal using the determined set of antennas.

The determining may include selecting a set of antennas which comprises at least the same or a larger number than the maximum expected number of MIMO layers. A criterion/criteria for selection of the set may be any of: to achieve the minimum power consumption, maximize throughput for the WD, minimize number of hybrid automatic repeat request, HARQ, non-acknowledgements, NACKs, maximize number of HARQ acknowledgements, ACKs, minimize PDSCH block error rate, BLER, maximize signal-to-interference ratio, SINR, and any combination thereof. The criterion may be the combination, wherein the criterion comprises a weighted trade-off between them.

The method may comprise turning off antennas that are not in the selected set, and reporting a zero or low value for the antennas turned off during CSI measurements and reporting, or sounding reference signal, SRS, transmission.

The method may comprise turning off antennas which are more than the maximum number of layers to save power consumption. The method may comprise turning off the antennas which are more than the maximum number of layers when a first quality metric is satisfied, and employing at least the same or a larger number than the maximum expected number of MIMO layers until a second quality metric is satisfied. The first and second quality metrics may be the same quality metric. The first and second quality metrics may be different, and the second quality metric may take priority over the first quality metric.

The method may comprise turning ON or OFF antennas according to the determined set of antennas.

The estimating may be based on observation of a historical behavior of the network node.

The estimating may include any of that the number of MIMO layers is not a greater number of MIMO layers than an indicated rank indicator, RI, by the WD after a CSI report, that the number of MIMO layers is not a greater number of MIMO layers than the number of configured SRS resources, that the number of MIMO layers is not a greater number of MIMO layers than a specific number of MIMO layers in a specific cell or bandwidth part, BWP, and that the configured type of CSI report is an indication of the expected number of layers.

The estimating may include determining the exact number of scheduled MIMO layers by decoding a scheduling downlink control information, DCI. The scheduling DCI may be the one scheduling a PDSCH that is transmitted via the MIMO layers. The determining of the exact number of scheduled MIMO layers may include identifying the format of the DCI.

The estimating may comprise estimating the number of MIMO layers by a machine learning algorithm.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 3 is a flowchart illustrating exemplary methods implemented in a communication system including a host computer, a network node and a wireless device for executing a client application at a wireless device according to some embodiments of the present disclosure;

FIG. 4 is a flowchart illustrating exemplary methods implemented in a communication system including a host computer, a network node and a wireless device for receiving user data at a wireless device according to some embodiments of the present disclosure;

DETAILED DESCRIPTION

Figure 1:
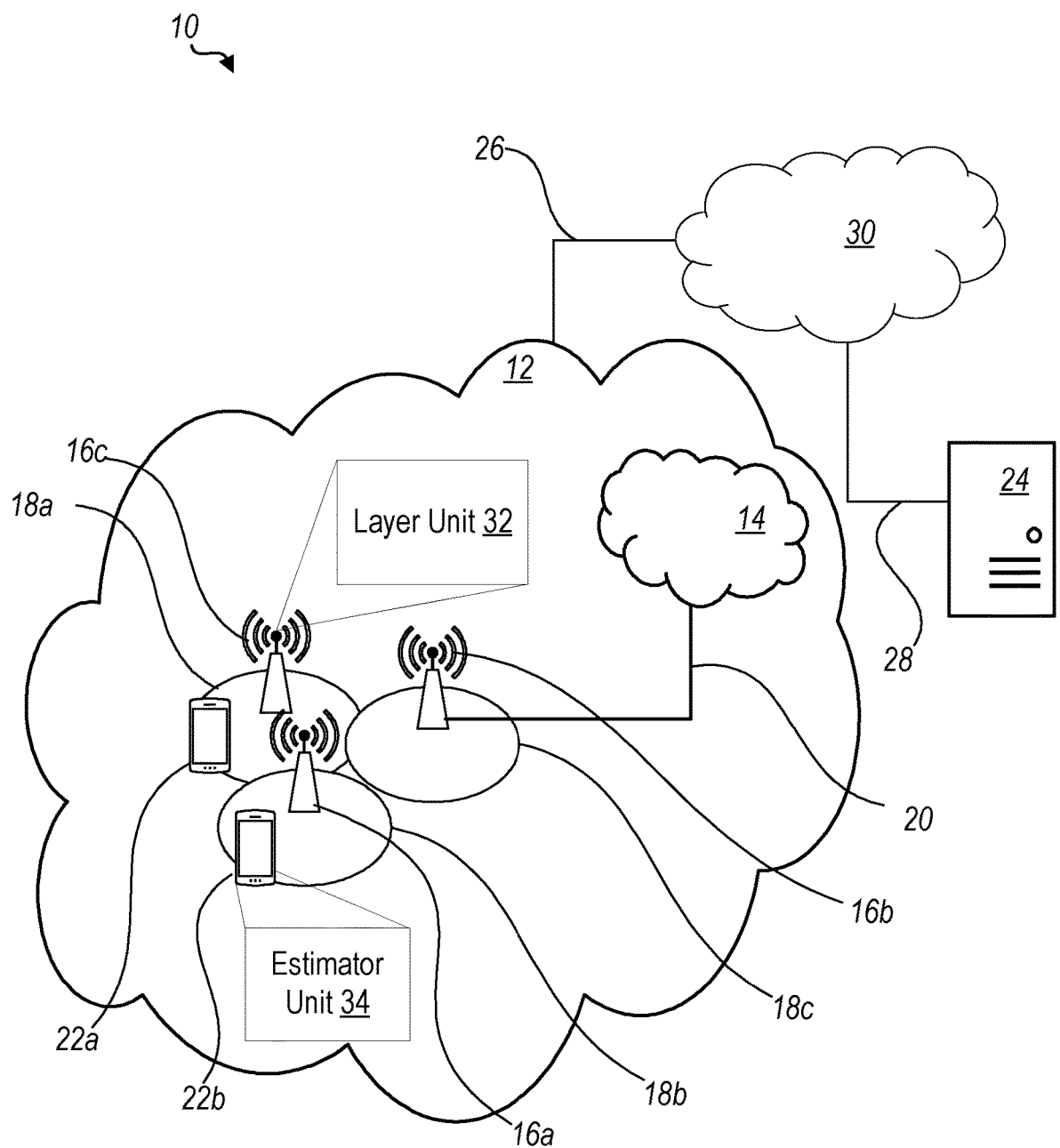
FIG. 1 is a schematic diagram of an exemplary network architecture illustrating a communication system connected via an intermediate network to a host computer according to the principles in the present disclosure.

Downlink transmission over PDSCH can be scheduled to be multi-layer, up to the maximum number of layers indicated by WD in its capability information. In a default configuration, the WD is expected to have all the antennas ON in order to receive PDSCH. In some cases this leads to improving the effective link quality and the associated throughput; however, it may also come at the cost of increased WD power consumption. Furthermore, in practice, the WD may be rarely scheduled with the maximum number of layers (can be as high as 8), and thus it may not be necessary to always keep all the WD antennas ON.

Currently, the knowledge of the number of layers is limited to the WD capability information provided by the WD and/or the configuration of the maximum number of layers per cell or per bandwidth part (BWP). However, the network node (e.g., gNB) may employ a varying number of layers, including often instantaneously a lower number, in a specific BWP, frame, such as based on channel conditions, and so on.

Therefore, therefore it may be useful to provide efficient techniques that enable efficient and robust antenna adaptation, allowing WD power savings, depending on the number of MIMO layers scheduled and/or or expected to be scheduled for the WD.

Some embodiments of the present disclosure provide techniques and mechanisms used in order to first obtain knowledge about the number of layers that is employed or expected to be employed. Particularly, some embodiments of the present disclosure include learning-based mechanisms which can be used by the WD to obtain knowledge, e.g., about how the employed number of layers relates to, e.g., the DL rank indicator (RI) indicated by the WD, or the number of sounding reference signal (SRS) ports configured in the uplink (UL), or about other typical network node (e.g., gNB) scheduling behavior.

Second, the WD may use the obtained knowledge in order to adapt its antennas by turning them ON/OFF according to different criteria, e.g., minimizing the power consumption, maximizing throughput, or trade-off(s) between the different criteria.

Some embodiments of the present disclosure advantageously allow the WD to adapt its active receive antenna set according to the number of scheduled MIMO layers, or expected to be scheduled, according to different criteria, leading e.g., to lower power consumption while avoiding throughput degradation, sometimes even higher throughput based on the chosen criteria, and so on.

Before describing in detail exemplary embodiments, it is noted that the embodiments reside primarily in combinations of apparatus components and processing steps related to wireless device (WD)-autonomous physical downlink shared channel (PDSCH) receiver (RX) antenna adaptation. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IoT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

As used herein, the term "set", such as a set of antennas, is used herein and may include a set of one or more elements (e.g., receiver antennas).

As used herein, the term "estimate" may be used broadly to include determining based on one or more criteria, factors, observations, parameters, indications, values, threshold, data. In some embodiments, estimating may include, based on collected data, such as data regarding network node behavior, estimating e.g., a number of MIMO layers by identifying patterns, learning patterns, learning data distribution, or any other machine learning models, algorithms and/or classifications, etc.

In some embodiments, the term "learning" is used herein and may indicate using one or more machine learning models, algorithms or techniques that a WD can use for PDSCH receiver antenna adaptation according to one or more of the principles disclosed herein.

Although the description herein may be explained in the context of PDSCH channel, it should be understood that the principles may also be applicable to other channels, such as other downlink channels.

Any two or more embodiments described in this disclosure may be combined in any way with each other.

The term "signaling" used herein may comprise any of: high-layer signaling (e.g., via Radio Resource Control (RRC) or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

Generally, it may be considered that the network, e.g., a signaling radio node and/or node arrangement (e.g., network node), configures a WD, in particular with the transmission resources. A resource may in general be configured with one or more messages. Different resources may be configured with different messages, and/or with messages on different layers or layer combinations. The size of a resource may be represented in symbols and/or subcarriers and/or resource elements and/or physical resource blocks (depending on domain), and/or in number of bits it may carry, e.g. information or payload bits, or total number of bits. The set of resources, and/or the resources of the sets, may pertain to the same carrier and/or bandwidth part, and/or may be located in the same slot, or in neighboring slots.

In some embodiments, control information on one or more resources may be considered to be transmitted in a message having a specific format. A message may comprise or represent bits representing payload information and coding bits, e.g., for error coding.

Receiving (or obtaining) information may comprise receiving one or more information messages (e.g., payload/data in PDSCH, SRS configuration, CSI report information). It may be considered that receiving signaling comprises demodulating and/or decoding and/or detecting, e.g. blind detection of, one or more messages, in particular a message carried by the signaling, e.g. based on an assumed set of resources, which may be searched and/or listened for the information. It may be assumed that both sides of the communication are aware of the configurations, and may determine the set of resources, e.g. based on the reference size.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

Transmitting in downlink may pertain to transmission from the network or network node to the terminal. The terminal may be considered the WD or UE. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Configuring a Radio Node

Configuring a radio node, in particular a terminal or user equipment or the WD, may refer to the radio node being adapted or caused or set and/or instructed to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources, or e.g., configuration for performing certain measurements on certain subframes or radio resources. A radio node may configure itself, e.g., based on configuration data received from a network or network node 16. A network node 16 may use, and/or be adapted to use, its circuitry/ies for configuring. Allocation information may be considered a form of configuration data. Configuration data may comprise and/or be represented by configuration information, and/or one or more corresponding indications and/or message/s.

Configuring in General

Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node 16, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal (e.g. WD) may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide for wireless device (WD)-autonomous physical downlink shared channel (PDSCH) receiver (RX) antenna adaptation. Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a layer unit 32 which is configured to one or more of: receive a channel state information (CSI) report from the WD; and/or schedule and/or transmit a downlink (DL) channel to the WD using a number of multiple-input multiple-output (MIMO) layers, the number of MIMO layers used based at least in part on the received CSI report.

A wireless device 22 is configured to include an estimator unit 34 which is configured to one or more of: estimate an expected number of multiple-input multiple-output (MIMO) layers based at least in part on channel state information (CSI) and/or a sounding reference signal (SRS) configuration; determine a set of antennas to use based at least in part on the estimated expected number of MIMO layers; and/or receive a MIMO signal using the determined set of antennas.

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include a monitor unit 54 configured to enable the service provider to observe, monitor, control, transmit to and/or receive from the network node 16 and/or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include layer unit 32 configured to perform network node methods disclosed herein such as those described with respect to FIG. 7 and other figures.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers. The radio interface may also include a plurality of antennas.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a estimator unit 34 configured to perform the WD methods disclosed herein such as those described with respect to FIG. 8 and other figures.

Figure 2:
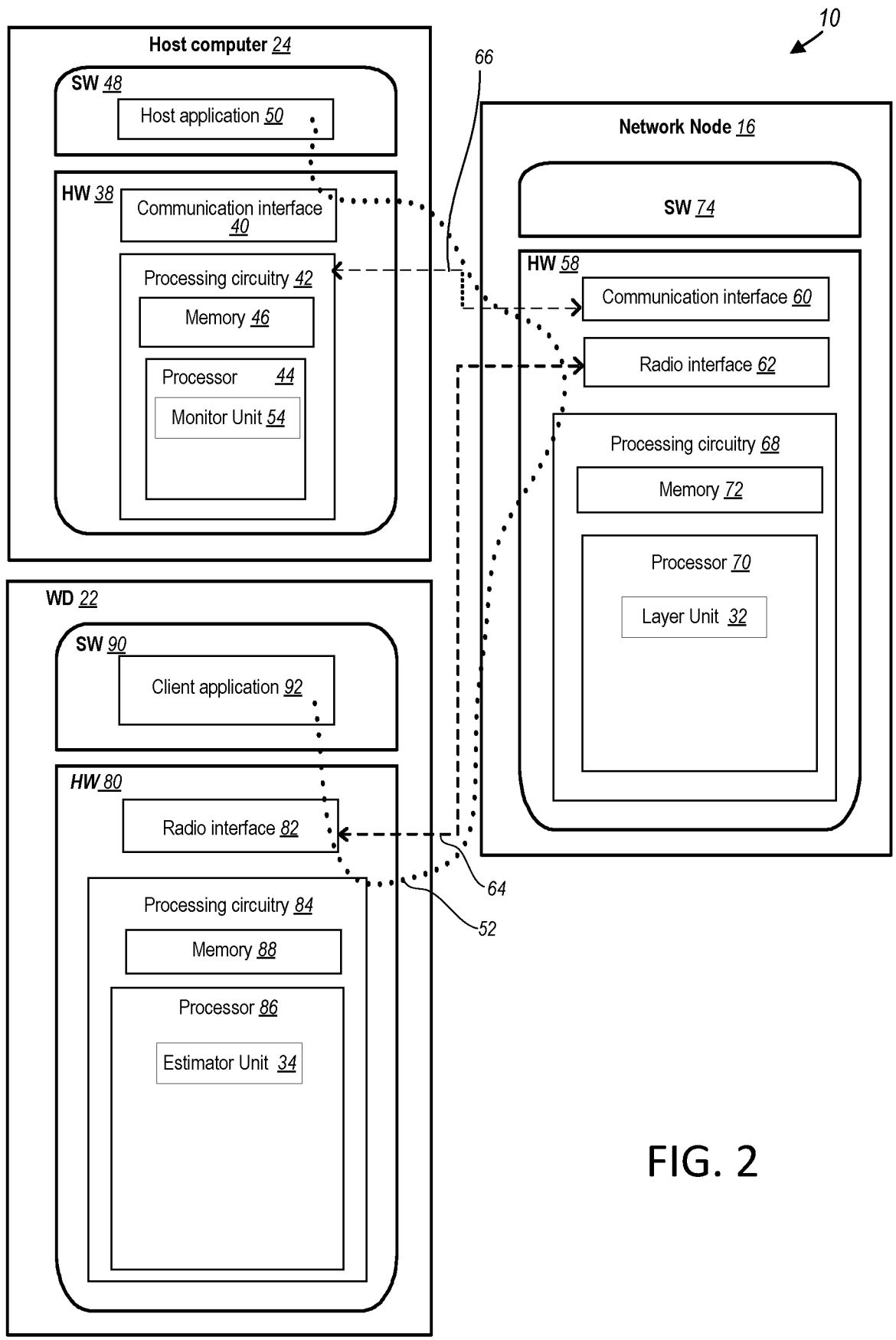
FIG. 2 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as layer unit 32, and estimator unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 3 is a flowchart illustrating an exemplary method implemented in a communication system, such as, for example, the communication system of FIGS. 1 and 2, in accordance with one embodiment. The communication system may include a host computer 24, a network node 16 and a WD 22, which may be those described with reference to FIG. 2. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 4 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figure 5:
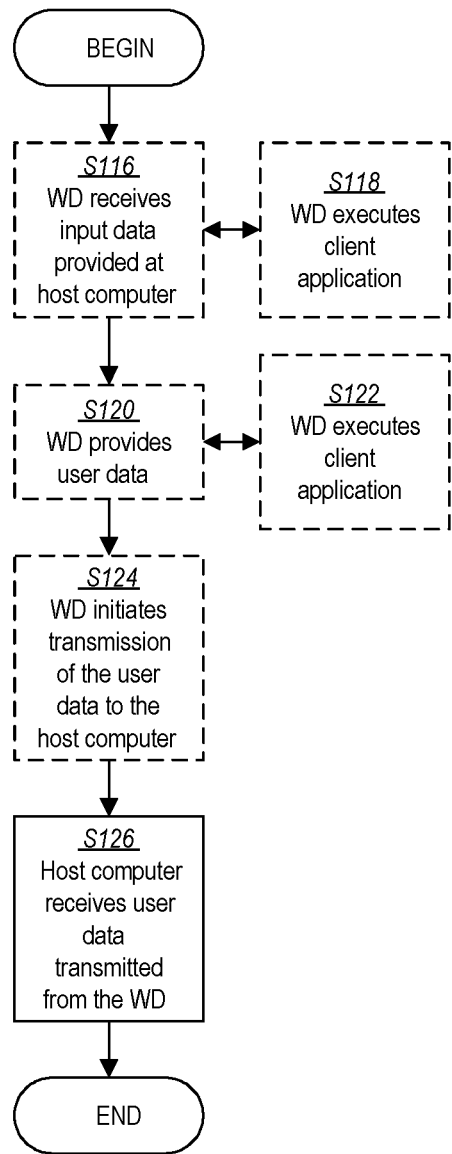
FIG. 5 is a flowchart illustrating exemplary methods implemented in a communication system including a host computer, a network node and a wireless device for receiving user data from the wireless device at a host computer according to some embodiments of the present disclosure.

FIG. 5 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 6:
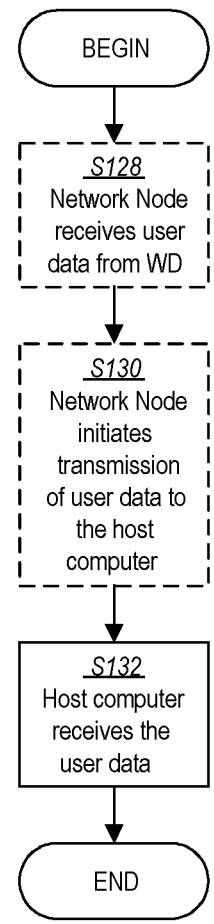
FIG. 6 is a flowchart illustrating exemplary methods implemented in a communication system including a host computer, a network node and a wireless device for receiving user data at a host computer according to some embodiments of the present disclosure.

FIG. 6 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 7:
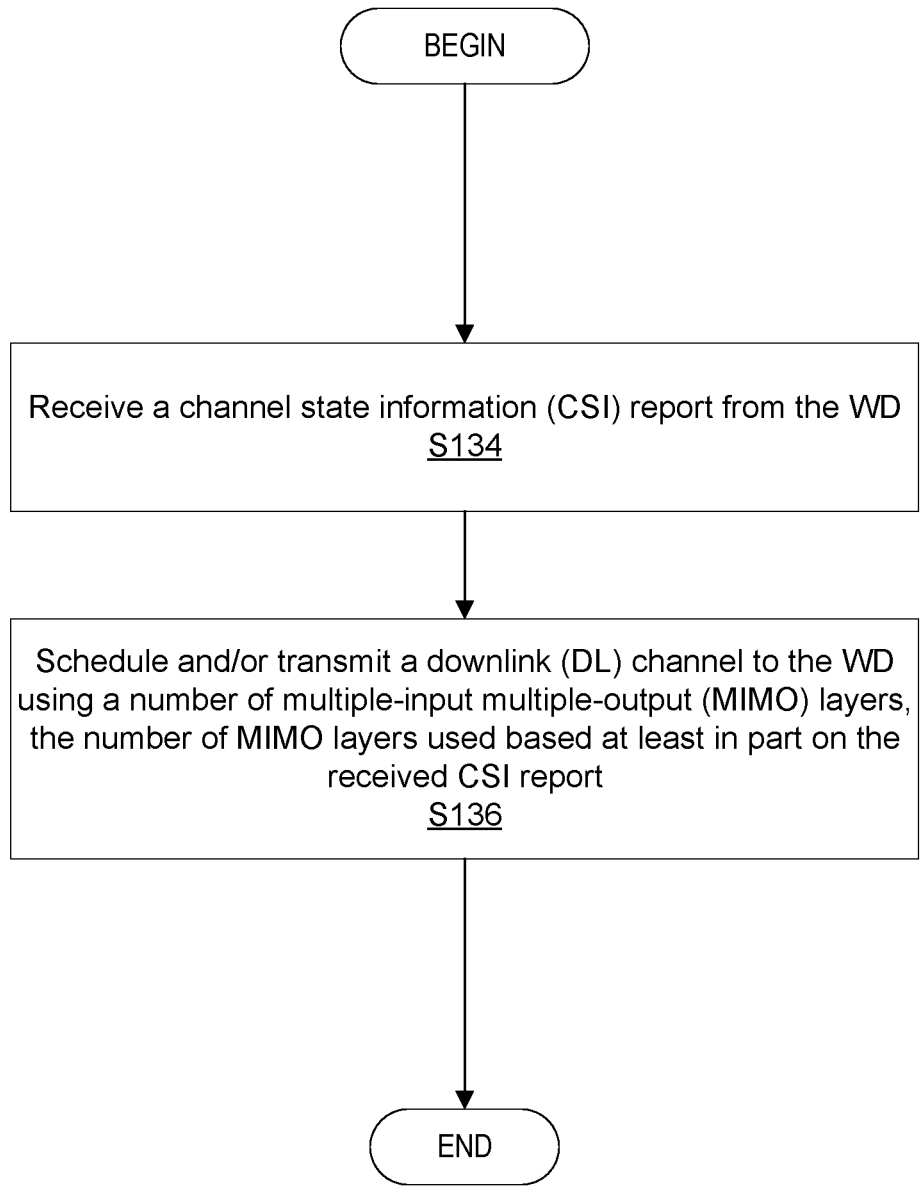
FIG. 7 is a flowchart of an exemplary process in a network node for layer unit according to some embodiments of the present disclosure.

FIG. 7 is a flowchart of an exemplary process in a network node 16 according to some embodiments of the present disclosure. One or more Blocks and/or functions and/or methods performed by the network node 16 may be performed by one or more elements of network node 16 such as by layer unit 32 in processing circuitry 68, processor 70, radio interface 62, etc. according to the example method. The example method includes receiving (Block S134), such as via layer unit 32, processing circuitry 68, processor 70 and/or radio interface 62, a channel state information (CSI) report from the WD 22. The method includes scheduling and/or transmitting (Block S136), such as via layer unit 32, processing circuitry 68, processor 70 and/or radio interface 62, a downlink (DL) channel to the WD using a number of multiple-input multiple-output (MIMO) layers, the number of MIMO layers used based at least in part on the received CSI report.

In some embodiments, the method further includes transmitting, such as via layer unit 32, processing circuitry 68, processor 70 and/or radio interface 62, a sounding reference signal (SRS) configuration, the number of MIMO layers used based at least in part on the transmitted SRS configuration. In some embodiments, the scheduling and/or transmitting using the number of MIMO layers is used by the WD 22 for estimating a number of MIMO layers and/or for autonomously adapting PDSCH receiver antennas according to the techniques disclosed herein.

Figure 8:
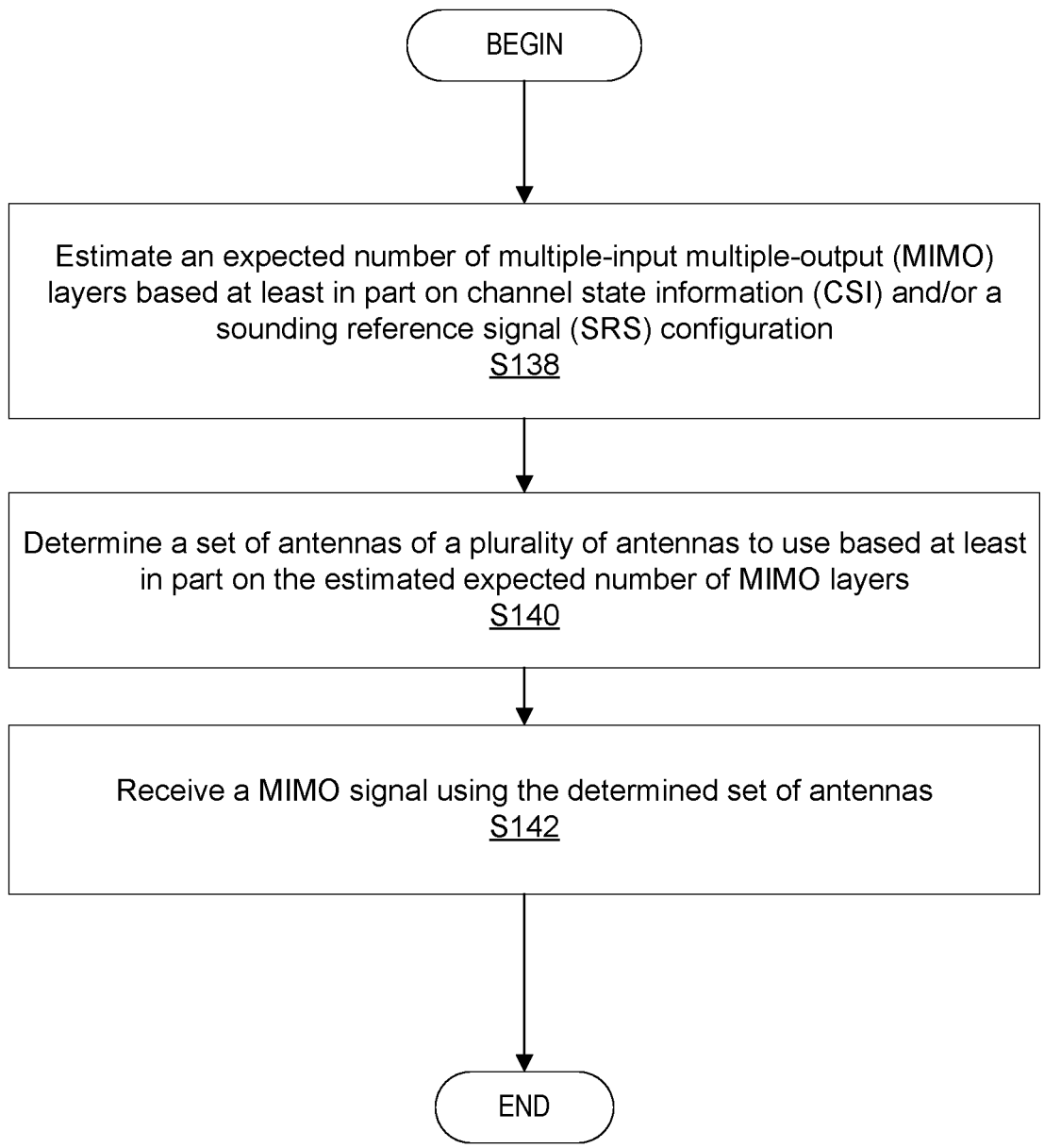
FIG. 8 is a flowchart of an exemplary process in a wireless device for estimator unit according to some embodiments of the present disclosure.

FIG. 8 is a flowchart of an exemplary process in a wireless device 22 for wireless device (WD)-autonomous physical downlink shared channel (PDSCH) receiver (RX) antenna adaptation according to some embodiments of the present disclosure. One or more Blocks and/or functions and/or methods performed by WD 22 may be performed by one or more elements of WD 22 such as by estimator unit 34 in processing circuitry 84, processor 86, radio interface 82, etc. The example method includes estimating (Block S138), such as via estimator unit 34, processing circuitry 84, processor 86 and/or radio interface 82, an expected number of multiple-input multiple-output (MIMO) layers based at least in part on channel state information (CSI) and/or a sounding reference signal (SRS) configuration. The method includes determining (Block S140), such as via estimator unit 34, processing circuitry 84, processor 86 and/or radio interface 82, a set of antennas of a plurality of antennas to use based at least in part on the estimated expected number of MIMO layers. The method includes receiving (Block S142), such as via estimator unit 34, processing circuitry 84, processor 86 and/or radio interface 82, a MIMO signal using the determined set of antennas.

In some embodiments, the method further includes (e.g., dynamically) turning ON or OFF antennas according to the determined set of antennas. In some embodiments, the estimating further includes estimating, such as via estimator unit 34, processing circuitry 84, processor 86 and/or radio interface 82, the number of MIMO layers by a machine learning algorithm.

Having described the general process flow of arrangements of the disclosure and having provided examples of hardware and software arrangements for implementing the processes and functions of the disclosure, the sections below provide details and examples of arrangements wireless device (WD)-autonomous physical downlink shared channel (PDSCH) receiver (RX) antenna adaptation, which may be implemented by the network node 16, wireless device 22 and/or host computer 24.

Some embodiments in the present disclosure provide techniques and mechanisms which are employed by the WD 22 to obtain the knowledge about the expected MIMO layer transmission, and further exploit the knowledge to adapt its employed antennas (or antenna ports) according to a specific criterion, or trade-off(s) between different criteria. Specifically, some embodiments may include one or more of the two steps described below.

Step 1: Obtaining the Knowledge about the Number of MIMO Layers

Substep 1-1: Obtaining Knowledge of the Expected Maximum Number of Layers

In one approach, the WD 22 predicts, such as for example via processing circuitry 84, the expected number of maximum layers by observing the historical behavior of the network node 16 (e.g., gNB). For example, the WD 22 learns, such as for example via processing circuitry 84 and/or radio interface 82, that the network node 16 (e.g., gNB) does not schedule the WD 22 with a greater number of layers than the indicated rank indicator (RI) by the WD 22 after the channel state information (CSI) report (e.g., RI may be included in the CSI report reported to network node 16 by the WD 22). In another example, the WD 22 learns, such as for example via processing circuitry 84 and/or radio interface 82, that the network node 16 (e.g., gNB) does not schedule the WD 22 with a greater number of layers than the number of configured SRS resources. As such the WD 22, considers the expected maximum number of layers to not be more than the indicated RI or the number of SRS ports.

In a related realization of this approach, the WD 22 may learn, such as for example via processing circuitry 84 and/or radio interface 82, that the network node 16 (e.g., gNB) does not schedule the WD 22 with more than a specific number of MIMO layers in a specific cell, BWP, and so on. For example, the WD 22 learns, such as for example via processing circuitry 84 and/or radio interface 82, that the network node 16 (e.g., gNB) does not schedule the WD 22 with more than a single-layer in one BWP, but with a larger number of layers in another BWP.

In yet another approach, the WD 22 notes (or observes or determines or learns or is configured such that) the configured type of CSI report is an indication of the expected number of layers, e.g., if a Type II CSI is used, the WD 22 does not expect more than two-layers of transmission, but if a Type I CSI report is used, then a larger number of layers may be expected or predicted.

In some embodiments, the WD 22 may further learn, such as for example via processing circuitry 84 and/or radio interface 82, the probability of occurrence of such scheduling practices by the network node 16 if they are typical, but not guaranteed all of the time. Such learned probability may factor into the WD's 22 determination and/or prediction of the expected number of maximum MIMO layers from the network node 16.

Substep 1-2: Obtaining Knowledge of Exact Number of Layers

In another approach, the WD 22 determines and/or becomes aware of and/or otherwise obtains knowledge or information about, such as for example via processing circuitry 84 and/or radio interface 82, the exact number of scheduled layers by decoding the scheduling downlink control information (DCI) (e.g., the DCI scheduling the PDSCH that is transmitted via the MIMO layers). This can also be obtained by the WD 22 identifying the format of the related DCI, e.g., DCI 1-0 means a single-layer reception, while DCI 1-1 can potentially entail a multi-layer reception.

In yet another approach, the WD 22 predicts, such as for example via processing circuitry 84, the number of layers used by the network node 16 for scheduling PDSCH by learning network node 16 behavior. For example, the WD 22 learns, such as for example via processing circuitry 84 and/or radio interface 82, that the network node 16 consistently (or at least primarily, such as, over a predetermined threshold percentage value) uses the reported RI from the WD 22 as the number of layers to be scheduled. Or, the WD 22 learns, such as for example via processing circuitry 84 and/or radio interface 82, that network node 16 consistently (or at least primarily, such as, over a predetermined threshold percentage value) uses a specific number of layers in a specific cell, BWP, frame and so on.

Step 2: Antenna Adaptation to the Number of MIMO Layers

Substep 2-1: Antenna Adaptation to the Expected Maximum Number of MIMO Layers

In one embodiment, the WD 22 determines and/or becomes aware of and/or obtains knowledge or information about, such as for example via processing circuitry 84 and/or radio interface 82, the maximum number of layers (e.g., by configuration such as radio resource control (RRC) signaling, or learning from network node 16 behavior, and so on as described in Step 1). As such, the WD 22 is aware that it can potentially employ only a maximum number of antennas (or antenna ports) equal to the expected maximum number of layers. Here, the expected number of layers may be lower than the WD 22 capability, or lower than the currently configured layer constraint/restriction/limitation (e.g., RRC configured maximum number of MIMO layers for PDSCH). As an intermediate situation, the WD 22 may, such as for example via processing circuitry 84 and/or radio interface 82, configure a number of antennas that exceeds the number of expected layers but is lower than the configured constraint.

In one embodiment, the WD 22 selects a set of antennas to be at least the same/equal to or a larger number than the maximum expected number of layers. The criterion to choose the set can be, e.g., to achieve the minimum power consumption, maximize WD 22 throughput, minimize number of hybrid automatic repeat request (HARQ) non-acknowledgements (NACKs), or maximize number of HARQ acknowledgements (ACKs), minimize PDSCH block error rate (BLER), maximize signal-to-interference ratio (SINR), and so on. The criterion can also be a combination of such criteria, or a trade-off between them, e.g., weighted trade-off between minimizing power consumption, and maximizing throughput, or other criterion. For example, the criterion to minimize the power consumption, may lead to minimizing the number of employed antennas, while the criterion to maximize the throughput may lead to employing all the antennas. Another criterion which can be based on these two options, may lead to a number of antennas employed between the two. As such, the WD 22 can e.g., turn off some of the antennas (such as those antennas that are not in the selected set), and thus report a zero or low value for the associated antennas during CSI measurements and reporting, or sounding reference signal (SRS) transmission.

In another embodiment, the WD 22 may decide, such as for example via processing circuitry 84, to turn off additional antennas which are more than the maximum number of layers, e.g., to save power consumption. In this case, the WD 22 may decide, such as for example via processing circuitry 84, to perform the antenna adaptation, if a specific quality metric is satisfied, e.g., the target BLER for PDSCH reception is not exceeded with a specific number of antennas. However, in case the quality metric is not satisfied or for any other reason, e.g., increasing the throughput, or robustness, the WD 22 may decide, such as for example via processing circuitry 84, to employ more antennas until the quality metric or other additional conditions are satisfied. For example, the WD 22 may expect a maximum of two layers, and thus a minimum of two antennas should be kept running. The WD 22 may, e.g., select, such as for example via processing circuitry 84 and/or radio interface 82, the two antennas with the best channel conditions for reception. It is also possible that the antenna selection also depends on the receiver algorithms used at the WD 22 side. If the quality metric is satisfied, then the same subset is kept, but if e.g. the PDSCH BLER is higher than a specific number/value, or the number of PDSCH NACKs are higher than a specific threshold, then the WD 22 may, such as for example via processing circuitry 84 and/or radio interface 82, add additional antennas to improve the performance until the quality metric is satisfied/met or exceeded.

In some embodiments, the WD 22 may determine, such as for example via processing circuitry 84 and/or radio interface 82, the subset(s) of antennas to be kept ON and turned OFF by performing CSI evaluations by collecting samples from all antennas, then subsequently using samples from different antenna subsets and identifying subsets that provide best performance, preferably performance that is only negligibly or moderately degraded compared to using the full antenna set. One or more of the criteria listed above may be used in the selection process.

In some embodiments, if the network node 16 typically but does not always schedule PDSCH for the WD 22 according to the expected number of layers' rule such as determined in Step 1, the WD 22 may use the probability of not following the rule in determining whether and to which extent to reduce the number of antenna elements. If the typical rule is not followed only infrequently, e.g., the probability is lower than the target BLER for first PDSCH transmission, the WD 22 may reduce the number of antennas as is the rule held in general. If the probability is clearly higher, the WD 22 may not perform antenna element reduction. Intermediate behaviors, e.g. partial reduction, are also contemplated as being possible.

Substep 2-2: Antenna Adaptation to the Known Number of MIMO Layers

In one embodiment, the WD 22 determines and/or becomes aware of and/or obtains knowledge or information about, such as for example via processing circuitry 84 and/or radio interface 82, the exact number of MIMO layers as described in Substep 1-2.

In one approach, the WD 22 is further aware that the there is a specific offset between physical downlink control channel (PDCCH) and potentially the scheduled PDSCH. For example, the WD 22 is configured or expects cross-slot scheduling, or same-slot scheduling with a non-zero start and length indicator value (SLIV) value. Here, the WD 22 can also perform a learning mechanism, and analyze scheduling behavior of the network node 16 and may notice or learn that the WD 22 is always (or primarily) scheduled with an offset larger than a specific offset value. In this case, the WD 22 may decide to apply antenna adaptation if the time it takes for the antenna adaptation is smaller than the minimum offset between PDCCH and the corresponding scheduled PDSCH. As in the case of Substep 2-1, here the WD 22 may determine in the same way to apply antenna adaptation based on different criteria, e.g., to minimize the power consumption, or maximize the throughput as far as a specific quality metric for PDSCH reception is satisfied, e.g., the maximum PDSCH BLER, the number or proportion of HARQ ACK/NACK, and so on.

Extensions

In another approach, the WD 22 may decide, such as for example via processing circuitry 84, to apply the antenna reduction irrespective of the knowledge about the minimum offset between PDCCH and PDSCH. As a result, in case the WD 22 has missed successful decoding of a specific part of PDSCH, then the WD 22 can send a HARQ NACK to receive the related PDSCH again. Furthermore, the WD 22 may decide to apply a more robust strategy for receiving the re-transmission. For example, if the WD 22 has decided to minimize the power consumption and this led to turning OFF a number of antennas, the WD 22 may decide to keep one or more antennas (e.g., the ones with better channel quality) ON, to reduce the chance of additional HARQ NACK during re-transmissions.

In some embodiments, if, while applying antenna adaptation according to one of the expected number of layers strategies disclosed herein, the WD 22 observes a heightened actual BLER, the WD 22 may stop applying the antenna adaptation approach, or may re-evaluate network node 16 behavior according to one or more of the above embodiments. The WD 22 may also re-evaluate the antenna adaptation approach/technique periodically and/or pre-emptively and/or in response to a triggering event, to avoid performance degradation over time, etc.

Some embodiments of the present disclosure may include one or more of the following:

Method at WD 22 for MIMO signal reception, comprising one or more of:
 estimating an instantaneously expected number of MIMO layers, e.g. based on CSI information provided by the WD 22 or on SRS configurations provided by a network node 16;
 determining a set of receive antennas to use based on the expected number of MIMO layers and optionally on estimated channel conditions; and/or
 receiving MIMO signal transmission using the set of receive antennas.

The method, wherein the expected number of layers is estimated through employing learning mechanisms.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

Embodiments and Examples

Example A1. A network node configured to communicate with a wireless device (WD), the network node configured to, and/or comprising a radio interface and/or comprising processing circuitry configured to one or more of:
  receive a channel state information (CSI) report from the WD; and/or
  schedule and/or transmit a downlink (DL) channel to the WD using a number of multiple-input multiple-output (MIMO) layers, the number of MIMO layers used based at least in part on the received CSI report.

Example A2. The network node of Embodiment A1, wherein the network node and/or the radio interface and/or the processing circuitry is further configured to:
  transmit a sounding reference signal (SRS) configuration, the number of MIMO layers used based at least in part on the transmitted SRS configuration.

Example B1. A method implemented in a network node, the method comprising one or more of:
  receiving a channel state information (CSI) report from the WD; and/or
  scheduling and/or transmitting a downlink (DL) channel to the WD using a number of multiple-input multiple-output (MIMO) layers, the number of MIMO layers used based at least in part on the received CSI report.

Example B2. The method of Embodiment B1, further comprising:
  transmitting a sounding reference signal (SRS) configuration, the number of MIMO layers used based at least in part on the transmitted SRS configuration.

Embodiment C1. A wireless device (WD) configured to communicate with a network node, the WD configured to, and/or comprising a radio interface having a plurality of antennas and/or processing circuitry configured to one or more of:
  estimate an expected number of multiple-input multiple-output (MIMO) layers based at least in part on channel state information (CSI) and/or a sounding reference signal (SRS) configuration;
  determine a set of antennas of the plurality of antennas to use based at least in part on the estimated expected number of MIMO layers; and/or
  receive a MIMO signal using the determined set of antennas.

Embodiment C2. The WD of Embodiment C1, wherein the WD and/or the radio interface and/or the processing circuitry is further configured to:
  turn ON or OFF antennas according to the determined set of antennas.

Embodiment C3. The WD of any one of Embodiments C1 and C2, wherein the WD and/or the radio interface and/or the processing circuitry is further configured to estimate by being configured to:
  estimate the number of MIMO layers by a machine learning algorithm.

Embodiment D1. A method implemented in a wireless device (WD), the method comprising one or more of:
  estimating an expected number of multiple-input multiple-output (MIMO) layers based at least in part on channel state information (CSI) and/or a sounding reference signal (SRS) configuration;
  determining a set of antennas of a plurality of antennas to use based at least in part on the estimated expected number of MIMO layers; and/or
  receiving a MIMO signal using the determined set of antennas.

Embodiment D2. The method of Embodiment D1, further comprising:
  turning ON or OFF antennas according to the determined set of antennas.

Embodiment D3. The method of any one of Embodiments D1 and D2, estimating further comprises:
  estimating the number of MIMO layers by a machine learning algorithm.

The invention claimed is:

1. A wireless device (WD) configured to communicate with a network node of a communication system, the WD comprising:
  a radio interface having a plurality of antennas; and
  processing circuitry configured to:
    estimate an expected number of multiple-input multiple-output (MIMO) layers based at least in part on at least one of channel state information (CSI) or a sounding reference signal (SRS) configuration;
    determine a set of antennas from among the plurality of antennas based on the estimated expected number of MIMO layers;
    receive a MIMO signal using the determined set of antennas; and
    turn off antennas which are more than a maximum number of MIMO layers to save power consumption when a first quality metric is satisfied, and to employ at least a same or a larger number than the maximum expected number of MIMO layers until a second quality metric is satisfied.

2. The WD of claim 1, wherein the determination includes a selected set of antennas which comprises at least the same or a larger number than the maximum expected number of MIMO layers.

3. The WD of claim 2, wherein, with respect to receiving the MIMO signal, the processing circuitry is configured to select the selected set of antennas according to any one or more of the following criteria:
  minimizing power consumption;
  maximizing throughput for the WD;
  minimizing the number of hybrid automatic repeat request (HARQ) non-acknowledgements (NACKs);
  maximizing the number of HARQ acknowledgements (ACKs);

minimizing a Physical Downlink Shared Channel (PDSCH) block error rate (BLER); or maximizing a signal-to-interference ratio (SINR).

4. The WD of claim 3, wherein the processing circuitry is configured to select the selected set of antennas according to a weighted trade-off between any two or more of the criteria.

5. The WD of claim 2, wherein the processing circuitry is configured to turn off antennas that are not in the selected set, and report a zero or low value for the antennas turned off during CSI measurements and reporting, or SRS transmission.

6. The WD of claim 1, wherein the first and second quality metrics are the same quality metric.

7. The WD of claim 1, wherein the first and second quality metric are different, and the second quality metric takes priority over the first quality metric.

8. The WD of claim 1, wherein the estimation is based on observation of a historical behavior of the network node in terms of the maximum number of MIMO layers previously used with respect to prior CSI reporting by the WD or prior SRS configurations of the WD.

9. The WD of claim 1, wherein the estimation comprises any one or more of:
that the number of MIMO layers is not a greater number of MIMO layers than an indicated rank indicator (RI) by the WD after a CSI report;
that the number of MIMO layers is not a greater number of MIMO layers than the number of configured SRS resources;
that the number of MIMO layers is not a greater number of MIMO layers than a specific number of MIMO layers in a specific cell or bandwidth part (BWP); or
that the configured type of CSI report is an indication of the expected number of MIMO layers.

10. The WD of claim 1, wherein the processing circuitry is configured to determine the exact number of scheduled MIMO layers by decoding scheduled downlink control information (DCI).

11. The WD of claim 10, wherein the scheduling DCI is the one scheduling a PDSCH that is transmitted via the MIMO layers.

12. The WD of claim 10, wherein the determination of the exact number of scheduled MIMO layers includes identifying the format of the DCI.

13. The WD of claim 1, wherein the processing circuitry is further configured to estimate the number of MIMO layers according to a machine learning algorithm.

14. A method implemented in a wireless device (WD) the method comprising:
estimating an expected number of multiple-input multiple-output (MIMO) layers based at least in part on at least one of channel state information (CSI) or a sounding reference signal (SRS) configuration;
determining a set of antennas from among a plurality of antennas of the WD based on the estimated expected number of MIMO layers;
turning off antennas which are more than a maximum number of MIMO layers to save power consumption when a first quality metric is satisfied, and employing at least a same or a larger number than the maximum expected number of MIMO layers until a second quality metric is satisfied; and
receiving a MIMO signal using the determined set of antennas.

15. The method of claim 14, wherein the determining includes selecting a set of antennas which comprises at least the same or a larger number than the maximum expected number of MIMO layers.

16. The method of claim 15, wherein, with respect to receiving the MIMO signal, selecting the selected set of antennas is based on any one or more of the following criteria:
minimizing power consumption;
maximizing throughput for the WD;
minimizing the number of hybrid automatic repeat request (HARQ) non-acknowledgements (NACKs);
maximizing the number of HARQ acknowledgements (ACKs);
minimizing a Physical Downlink Shared Channel (PDSCH) block error rate (BLER); or
maximizing a signal-to-interference ratio (SINR).

17. The method of claim 16, wherein the selected set of antennas is selected according to a weighted trade-off between any two or more of the criteria.

18. The method of claim 15, further comprising turning off antennas that are not in the selected set, and reporting a zero or low value for the antennas turned off during CSI measurements and reporting, or SRS transmission.

19. The method of claim 14, wherein the first and second quality metrics are the same quality metric.

20. The method of claim 14, wherein the first and second quality metric are different, and the second quality metric takes priority over the first quality metric.

21. The method of claim 14, further comprising turning respective antennas among the plurality of antennas on or off, according to the determined set of antennas.

22. The method of claim 14, wherein estimating the expected number of MIMO layers is based on observation of a historical behavior of the network node in terms of the maximum number of MIMO layers previously used with respect to prior CSI reporting by the WD or prior SRS configurations of the WD.

* * * * *